United States Patent
Lei et al.

(10) Patent No.: US 10,172,110 B2
(45) Date of Patent: Jan. 1, 2019

(54) USER EQUIPMENT ASSISTED INDOOR SMALL CELL LOCATION DETERMINATION

(71) Applicant: AT&T Mobility II LLC, Atlanta, GA (US)

(72) Inventors: Hongyan Lei, Plano, TX (US); Yung Shirley Choi-Grogan, Issaquah, WA (US); Cheng P. Liu, Johns Creek, GA (US); David Orloff, Sammamish, WA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 15/668,569

(22) Filed: Aug. 3, 2017

(65) Prior Publication Data

US 2017/0332345 A1    Nov. 16, 2017

Related U.S. Application Data

(62) Division of application No. 15/051,154, filed on Feb. 23, 2016, now Pat. No. 9,749,810.

(51) Int. Cl.
*H04W 64/00* (2009.01)
*H04W 4/04* (2009.01)
(Continued)

(52) U.S. Cl.
CPC ......... *H04W 64/006* (2013.01); *H04W 4/023* (2013.01); *H04W 4/04* (2013.01); *H04W 4/90* (2018.02)

(58) Field of Classification Search
CPC ........ H04W 64/00; H04W 4/029; H04W 4/24
See application file for complete search history.

(56) References Cited

U.S. PATENT DOCUMENTS

| 7,738,875 B2 | 6/2010 | Jalil et al. |
| 8,112,096 B2 | 2/2012 | Mazlum et al. |

(Continued)

FOREIGN PATENT DOCUMENTS

| EP | 2482583 A1 | 1/2012 |
| WO | 2013060484 A1 | 5/2013 |
| WO | 2015179060 A1 | 11/2015 |

OTHER PUBLICATIONS

Cisco, "Cisco Universal Small Cell RAN Management System Data Sheet," cisco.com, Oct. 24, 2015. https://web.archive.org/web/20151024213139/http://www.cisco.com/c/en/us/products/collateral/wireless/universalsmallcellranmanagementsystem/datasheetc78732384.html. 7 pages.

(Continued)

*Primary Examiner* — Diane Mizrahi
(74) *Attorney, Agent, or Firm* — Amin, Turocy & Watson, LLP

(57) ABSTRACT

Performing user equipment (UE) assisted indoor small cell location determination is presented herein. A method can include in response to sending, by an access point device, a request directed to a mobile device to obtain mobile device location data representing a user equipment location of the mobile device, receiving, by the access point device, the mobile device location data from the mobile device; and based on the mobile device location data, determining, by the access point device, access point location data representing an access point location of the access point device. In an example, the mobile device location data can include coordinates of the mobile device comprising latitude of the mobile device and longitude of the mobile device, and a time stamp representing a time of generation of the coordinates. In another example, the mobile device location data can include an altitude of the mobile device.

20 Claims, 12 Drawing Sheets

(51) Int. Cl.
*H04W 4/90* (2018.01)
*H04W 4/02* (2018.01)

(56) References Cited

U.S. PATENT DOCUMENTS

| | | |
|---|---|---|
| 8,463,292 B2 | 6/2013 | Zhang |
| 8,478,290 B2 | 7/2013 | Yoeli |
| 8,670,388 B2 | 3/2014 | Jiao et al. |
| 8,738,033 B2 | 5/2014 | Giustina et al. |
| 8,768,301 B2 | 7/2014 | Howard |
| 8,934,919 B2 | 1/2015 | Tenny |
| 9,119,040 B2 | 8/2015 | Lipman et al. |
| 9,146,296 B2 | 9/2015 | Sampath et al. |
| 9,749,810 B1* | 8/2017 | Lei .................. H04W 4/04 |
| 2010/0093307 A1 | 4/2010 | Hui et al. |
| 2010/0323723 A1 | 12/2010 | Gerstenberger et al. |
| 2012/0329476 A1 | 12/2012 | Tenny |
| 2013/0132854 A1* | 5/2013 | Raleigh ............ G06F 3/0482 |
| | | 715/738 |
| 2013/0217408 A1 | 8/2013 | Difazio et al. |
| 2013/0225168 A1 | 8/2013 | Singh et al. |
| 2014/0120948 A1 | 5/2014 | Jin et al. |
| 2014/0315576 A1 | 10/2014 | Brisebois |
| 2015/0119086 A1 | 4/2015 | Mirowski et al. |
| 2015/0124630 A1 | 5/2015 | Zorlu et al. |
| 2016/0127871 A1 | 5/2016 | Smith et al. |
| 2016/0140120 A1 | 5/2016 | Garcia |
| 2016/0259062 A1 | 9/2016 | Raghupathy et al. |

OTHER PUBLICATIONS

Hratko, "Small Cells Getting Big Attention," theruckusroom.net, Aug. 3, 2015. http://www.theruckusroom.net/2015/08/smallcellsgettingbigattention.html. 4 pages.

Vanada, "Intelligent Femtocells, SON & Convergence," Telecom Cloud, telecomcloud.net, Apr. 19, 2011. http://www.telecomcloud.net/intelligentfemtocellsandconvergedhome/. 14 pages.

Office Action for U.S. Appl. No. 15/051,154 dated Dec. 14, 2016, 20 pages.

* cited by examiner

USER EQUIPMENT ASSISTED INDOOR SMALL CELL LOCATION DETERMINATION

RELATED APPLICATION

The present application is a divisional of, and claims priority to, U.S. patent application Ser. No. 15/051,154, filed Feb. 23, 2016, and entitled "USER EQUIPMENT ASSISTED INDOOR SMALL CELL LOCATION DETERMINATION," the entirety of which application is hereby incorporated by reference herein.

TECHNICAL FIELD

The subject disclosure generally relates to embodiments for user equipment (UE) assisted indoor small cell location determination.

BACKGROUND

Enhanced 911 (E911) services estimate a location of a 911 caller to assist with dispatching emergency personnel. Although global positioning system (GPS) based receivers can be utilized to obtain the location of the 911 caller, use of such receivers in indoor small cells, e.g., associated with home/residential network environments, associated with enterprise/business network environments, etc. has been limited due to cost, reduced/nonexistent indoor GPS signal reception within a building, etc. Consequently, conventional indoor small cell based technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
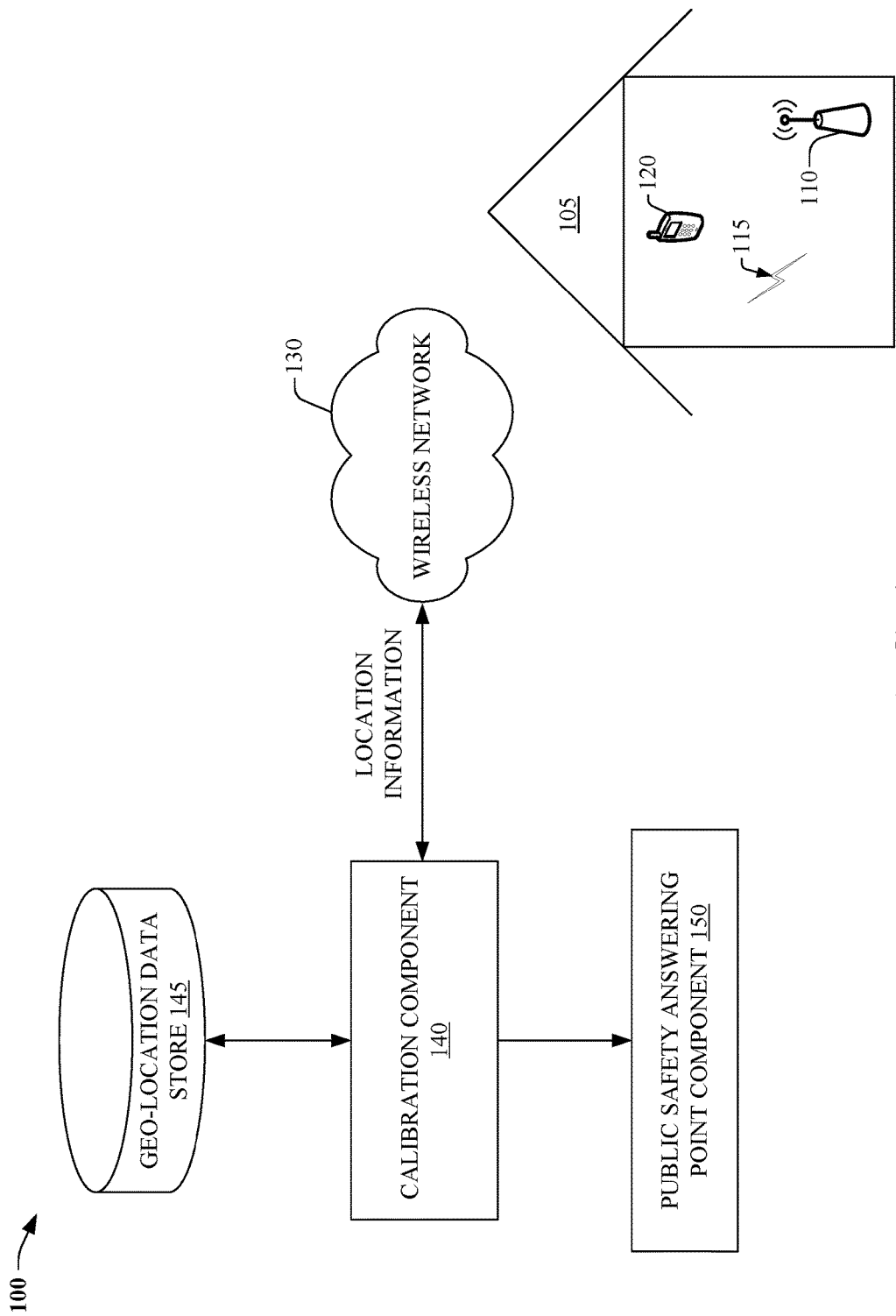
FIG. 1 illustrates a block diagram of an emergency telecommunication service network environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

An enterprise/business network environment, a home/residential network environment (e.g., comprising a Wireless Home Phone (WHP) service), etc. can utilize a small cell AP that is connected to phone equipment in an office or residence to support "wire line" phone service via a cellular network. The small cell AP can be taken to another location, e.g., another business location, on vacation, e.g., in a recreational vehicle (RV), a hotel room, etc. for maintaining the cellular enabled wire line phone service while traveling, etc. Although international call roaming is not enabled for small cell access points (APs), conventional small cell AP technologies support routing of emergency calls, e.g., 911 calls, etc. using wireless Enhanced 911, E-911, or E911 processes that link emergency callers with appropriate public resources.

In this regard, under wireless E911 Phase I and Phase II milestones issued by the U.S. Federal Communications Commission (FCC), wireless network operators must identify the phone number and cell phone tower used by emergency callers (Phase I), and wireless network operators must provide the latitude and longitude of callers, e.g., within 300 meters of the caller. (Phase II). Such location information is not only transmitted to a call center, e.g., Public Safety Answering Point (PSAP), for the purpose of sending emergency services to the scene of an incident, but is also used by wireless network operators to determine which PSAP to route 9-1-1 calls.

As described above, conventional small cell networks have had some drawbacks with respect to supporting wireless E911 services—due to reduced and/or nonexistent indoor, e.g., GPS, signal reception. Various embodiments disclosed herein can support and/or enhance small cell based emergency, e.g., E911, etc. services by utilizing UE assisted indoor small cell location determination. In addition, such location determination can be used to support commercial, non-emergency location based applications, e.g., user location monitoring, location based advertising, etc.

For example, a method can comprise: sending, by a small cell access point device comprising a processor, e.g., a WHP device, a request directed to a UE, mobile device, etc. to obtain UE location data, e.g., coordinates (latitude, longitude, etc.) obtained via a positioning system (e.g., GPS), information representing an altitude of the UE, etc. In this regard, as the small cell AP device can have a small transmit power/wireless coverage area capability, the small cell AP device can request UE location data from a UE that is in communication with the small cell AP device, e.g., the UE being close, substantially close, very close, e.g., within a few meters, of the small cell AP device.

In an embodiment, the method can comprise periodically sending, by the small cell access point device, the request to the UE, e.g., based on a defined processing wake-up interval, sampling interval, etc. of the small cell access point device.

In another embodiment, the method can comprise sending, by the small cell access point device, the request to the UE based on defined events associated with the small cell access, e.g., in response to power on reset, rebooting, etc. of the small cell access point device. Further, in response to the sending the request, the method can comprise receiving, by the small cell access point device, the location data from the UE, and determining, by the small cell access point device based on the UE location data, access point location data representing an access point location of the small cell access point device, e.g., for servicing of an emergency telecommunication, e.g., for servicing an E911 call received from a handset coupled to the small cell access point device.

In one embodiment, the UE location data comprises a time stamp representing an established time of generation of the UE location data, and the determining the access point location data can comprise determining whether the time stamp satisfies a defined condition with respect to a request time corresponding to the sending the request.

In this regard, in response to determining that the time stamp satisfies the defined condition with respect to the request time, e.g., in response to determining that the UE location data was measured in "real time", within a few seconds, etc. of the sending the request to the UE, the method can comprise selecting, by the small cell access point device, the UE location data as confirmed location data, and assigning, by the small cell access point device, the confirmed location data to the access point location data, e.g., for servicing the E911 call received from the handset coupled to the small cell access point device. As mentioned above, the small cell access point device can use the UE location data as the access point location, e.g., since the UE has been determined to be close, substantially close, etc. to the small cell access point device, e.g., which has a low transmit power/wireless coverage area.

In one embodiment, the method can comprise receiving, by the small cell access point device, multiple UE location data, e.g., location reports, from respective user equipments wireless coupled to the small cell access point device. In this regard, the method can comprise selecting UE location data from the location reports corresponding to a defined radio frequency (RF), electromagnetic, etc. condition, e.g., the selected UE location data corresponding to a UE determined to be closest to the small cell access point device based on a determined RF condition of the UE.

In another embodiment, in response to determining that the time stamp does not satisfy the defined condition with respect to the request time, e.g., in response to determining that the UE location data is "old", e.g., was likely measured, based on a request from another small cell access point device, when the UE could receive a positioning system, e.g., GPS, signal near an entrance/exterior wall of the building, the method can comprise selecting, by the small cell access point device, selected UE location data as estimated location data. Further, the method can comprise assigning, by the small cell access point device, the estimated location data to the access point location data, e.g., for servicing the E911 call received from the handset coupled to the small cell access point device.

In yet another embodiment, the method can comprise broadcasting, sending, etc., by the small cell access point device, the confirmed location data, the estimated location data, etc. to a neighboring small cell access point device, e.g., which is proximate to, in wireless communication with, etc. the small cell access point device. In this regard, the neighboring small cell access point device can use the confirmed location data or estimated location data for servicing an E911 call via the neighboring small cell access point device.

Another embodiment can comprise an access point device, e.g., a small cell access point device coupled, e.g., wired, to a handset, comprising: a processor and a memory that stores executable instructions that, when executed by the processor, facilitate performance of operations, comprising: sending, e.g., periodically, during a restart/reboot of the access point device, etc. a message directed to a user equipment requesting the user equipment to send a measurement report to the access point device—the measurement report comprising user equipment location data, e.g., coordinates (latitude, longitude, etc.) obtained via a position system (e.g., a GPS system), an altitude, etc. representing a user equipment location of the UE. Further, in response to the sending the message, the operations can comprise receiving the measurement report from the UE, and in response to the receiving the measurement report, determining access point location data representing an access point location of the access point device, e.g., for servicing an E911 call that has been dialed from the handset.

In one embodiment, the measurement report comprises a time stamp representing a time of determination, derivation, etc. of the user equipment location data, and the operations further comprise determining whether the time stamp satisfies a defined condition with respect to the sending the message. In this regard, in response to determining that the time stamp satisfies the defined condition, e.g., in response to determining that the user equipment location data has been measured, determined, derived, etc. within a defined period of time from the sending the message, e.g., within a few seconds, the operations can comprise assigning the user equipment location data to the access point location data as a confirmed access point location, e.g., for servicing the E911 call.

In another embodiment, in response to determining that the time stamp does not satisfy the defined condition, the operations can comprise polling a group of user equipments (UEs) comprising the user equipment to obtain location reports comprising UE location data for the group of UEs. In this regard, the operations can comprise selecting a location report of the location reports corresponding to a defined RF, electromagnetic, etc. condition with respect to communication between the access point device and the UEs, e.g., representing a UE that is closest, etc. to the access point device. Further, the operations can comprise obtaining an estimated access point location based on the selected location report, and assigning the estimated access point location to the access point location data, e.g., for servicing the E911 call.

In yet another embodiment, the operations can further comprise broadcasting the confirmed access point location or the estimated access point location to a neighbor access point device, e.g., for servicing an E911 call that has been dialed from a handset coupled to the neighbor access point device.

One embodiment can comprise a machine-readable storage medium, comprising executable instructions that, when executed by a processor, facilitate performance of operations, comprising: in response to sending, by an access point device, e.g., coupled to a WHP handset, a request for a measurement report directed to a mobile device, e.g., cellular phone, UE, etc., receiving, by the access point device, the measurement report from the mobile device—the measurement report comprising information, e.g., GPS based coordinates, an altitude, etc. representing a mobile device location of the mobile device. Further, the operations can comprise determining, by the access point device based on the information, an access point location of the access point device.

In an embodiment, the operations can further comprise: in response to determining that a time corresponding to a derivation of the measurement report satisfies a defined condition with respect to the receiving the measurement report, assigning the mobile device location to the access point location as a confirmed location of the access point device.

In another embodiment, the operations can further comprise: in response to determining that the time corresponding to the derivation of the measurement report does not satisfy the defined condition, polling a group of mobile devices comprising the mobile device to obtain an estimated location, and assigning the estimated location to the access point location.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via small cell access point device 110 (see below), to determine whether a time stamp representing a time of determination of user equipment location data satisfies a defined condition.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a gateway, wireless communication device, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by small cell access point device 110 (see below).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Aspects, features, and/or advantages of the disclosed subject matter can be exploited in substantially any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (enhanced GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless communication device, e.g., user equipment (UE), WHP device, etc. and/or within one or more elements of a network infrastructure, e.g., radio network controller, wireless access point (AP), etc.

Moreover, terms like "user equipment" (UE), "mobile station", "mobile subscriber station", "access terminal", "terminal", "handset", "appliance", "machine", "wireless communication device", "cellular phone", "personal digital assistant", "smartphone", "wireless device", "WHP device", and similar terminology refer to a wireless communication device, or wireless device, which is at least one of (1) utilized by a subscriber, customer, etc. of a wireless service, or communication service, to receive and/or convey data associated with storage of objects within a voice, video, sound, and/or substantially any data-stream or signaling-stream; or (2) utilized by a subscriber of a voice over internet protocol (VoIP) service that delivers voice communications over internet protocol (IP) networks such as the Internet or other packet-switched networks. Further, the foregoing terms are utilized interchangeably in the subject specification and related drawings.

Likewise, the terms "local wireless communications cite," "access point" (AP), "base station," "Node B," "eNodeB," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations and/or to/from a wireless communication device— unless context warrants particular distinction(s) among the terms. Further, the data and signaling streams can be packetized or frame-based flows.

A communication network, e.g., emergency telecommunication service network environment 100 (see below), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a wireless system e.g., a wireless communication device, small cell access point device 110, etc. for systems, methods, and/or apparatus disclosed herein can include a WHP based device, a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX/WHP phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi/WHP device, such as a dual-mode GSM, TDMA, IS-95 and/or iDEN/VoIP phones, UMTS phones, UMTS VoIP phones, or like devices or combinations thereof.

To provide support for the wireless system, the communication network can include a gateway routing component (not shown) that can include any suitable component that can perform centralized routing within a mobile, satellite, or similar network (but optionally need not include components that route strictly within a PSTN network), routing between communication networks, between networks of varying architecture (e.g., between PSTN, GSM, UMTS, WHP, Enterprise VoIP, the Internet, or combinations thereof), and the like. Specific examples of a gateway routing component can include, but are not limited to, a gateway mobile switching center (GMSC), a gateway GPRS support node (GGSN), a session border control (SBC) device, or like devices. Additionally, a data storage component of such system(s), device(s), etc. can include any suitable device, process, and/or combination device that can store digital and/or switched information (e.g., server, data store component, or the like).

Figure 2:
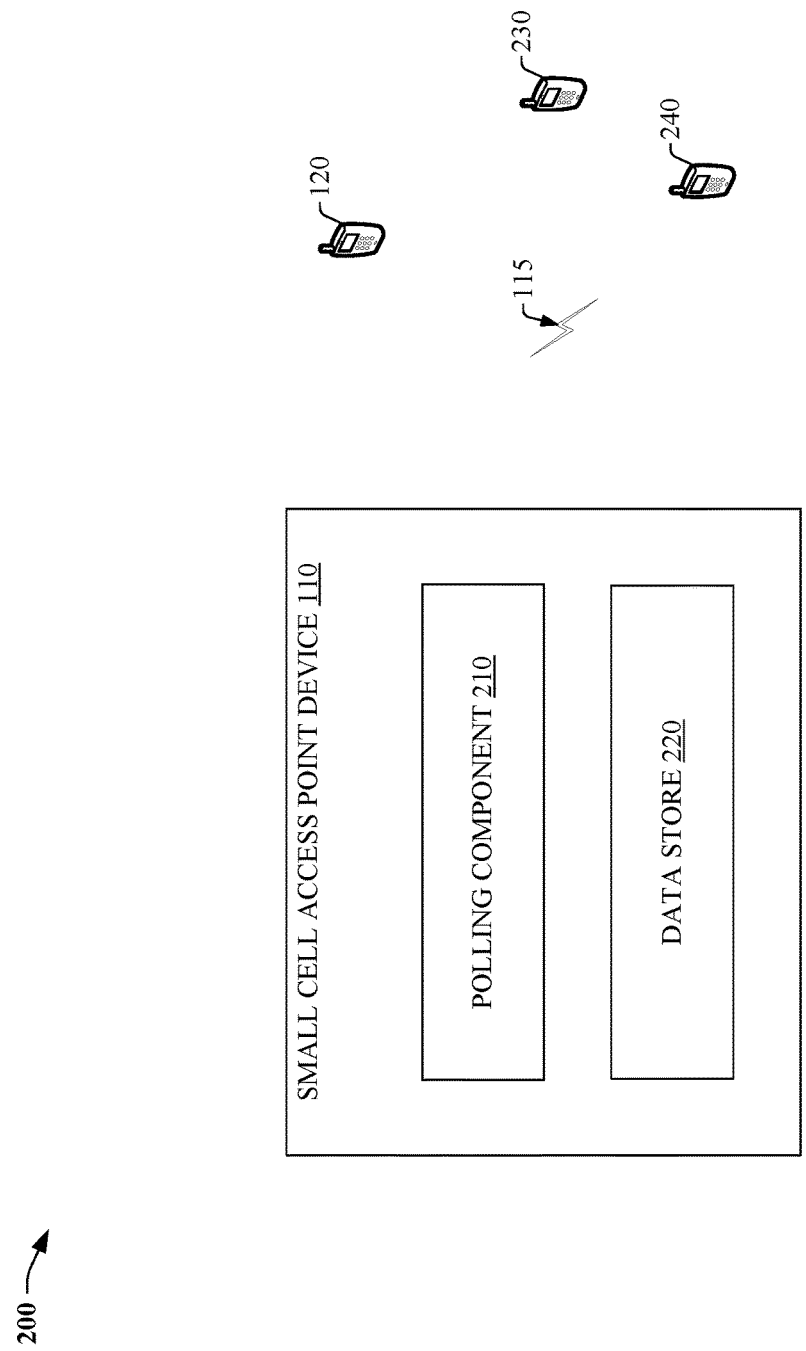
FIG. 2 illustrates a block diagram of a small cell access point (AP) device environment, in accordance with various embodiments.

Now referring to FIGS. 1 and 2, a block diagram (100) of an emergency telecommunication service network environment, and a block diagram (200) of a small cell access point device environment are illustrated, respectively, in accordance with various embodiments. In this regard, small cell access point device 110 can obtain geo-location, e.g., latitude, longitude, altitude, etc. data from a UE (e.g., 120, 230, 240), and based on such data, derive its location for supporting E911 regulatory requirements. As illustrated by FIG. 1, small cell access point device 110 can be coupled to wireless network 130 via wireless link 115. Wireless link 115 can be an over-the-air wireless link 115 comprising a downlink (DL) and an uplink (UL) (both not shown) that can utilize a predetermined band of radio frequency (RF) spectrum associated with, e.g., GSM, 3GPP UMTS, etc. Accordingly, small cell access point device 110 can be a GSM and/or 3GPP UMTS based device, etc.

Further, wireless network 130 can include software and/or hardware configured to provide connectivity to/from small cell access point device 110 and calibration component 140. In this regard, emergency telecommunication service network environment 100 can include one or more: macro, femto, or pico access points (APs) (not shown); base stations (BS) (not shown); landline networks (e.g., optical landline networks, electrical landline networks) (not shown) communicatively coupled to calibration component 140 and components of small cell access point device 110.

In various embodiments, small cell access point device 110 can communicate via any number of various types of wireless technologies including, but not limited to, cellular, WiFi, WiMax, wireless local area networks (WLAN), femto, etc. In corresponding embodiments, wireless network 130 can provide cellular, WiFi, WiMAX, WLAN, and/or other technologies for facilitating such communication. Further, wireless network 130 can include one or more of the Internet (or another communication network (e.g., IP-based network)), or a digital subscriber line (DSL)-type or broadband network facilitated by Ethernet or other technology, e.g., for communicating with one or more components of calibration component 140 and small cell access point device 110, e.g., a WHP handset (not shown) coupled to small cell access point device 110.

In various embodiments, emergency telecommunication service network environment 100 can include hardware and/or software for allocating resources to small cell access point device 110, e.g., converting or enforcing protocols, establishing and/or providing levels of Quality of Service (QoS), providing applications or services via wireless network 130, translating signals, and/or performing other desired functions to facilitate system interoperability and communication to and from small cell access point device 110.

Wireless network 130 can include data store component(s), a memory configured to store information, and/or computer-readable storage media storing computer-executable instructions enabling various operations performed via small cell access point device 110 and various components described herein. In this regard, although geo-location data store 145 is illustrated as being separate from wireless network 130, wireless network 130 can include one or more portions of geo-location data store 145. Further, although illustrated as being separate from wireless network 130, one or more other aspects, components, etc. of emergency telecommunication service network environment 100 can be included in wireless network 130.

Referring now to FIGS. 1 and 2, in various embodiment(s), small cell access point device 110 can comprise a WHP device installed in building 105. In this regard, an existing, e.g., public switch telephone network (PSTN) based, landline based, etc. corded/cordless telephone (not shown) can be plugged into small cell access point device 110, which can send/receive telephone calls directed to the landline based telephone via wireless network 130.

Figure 4:
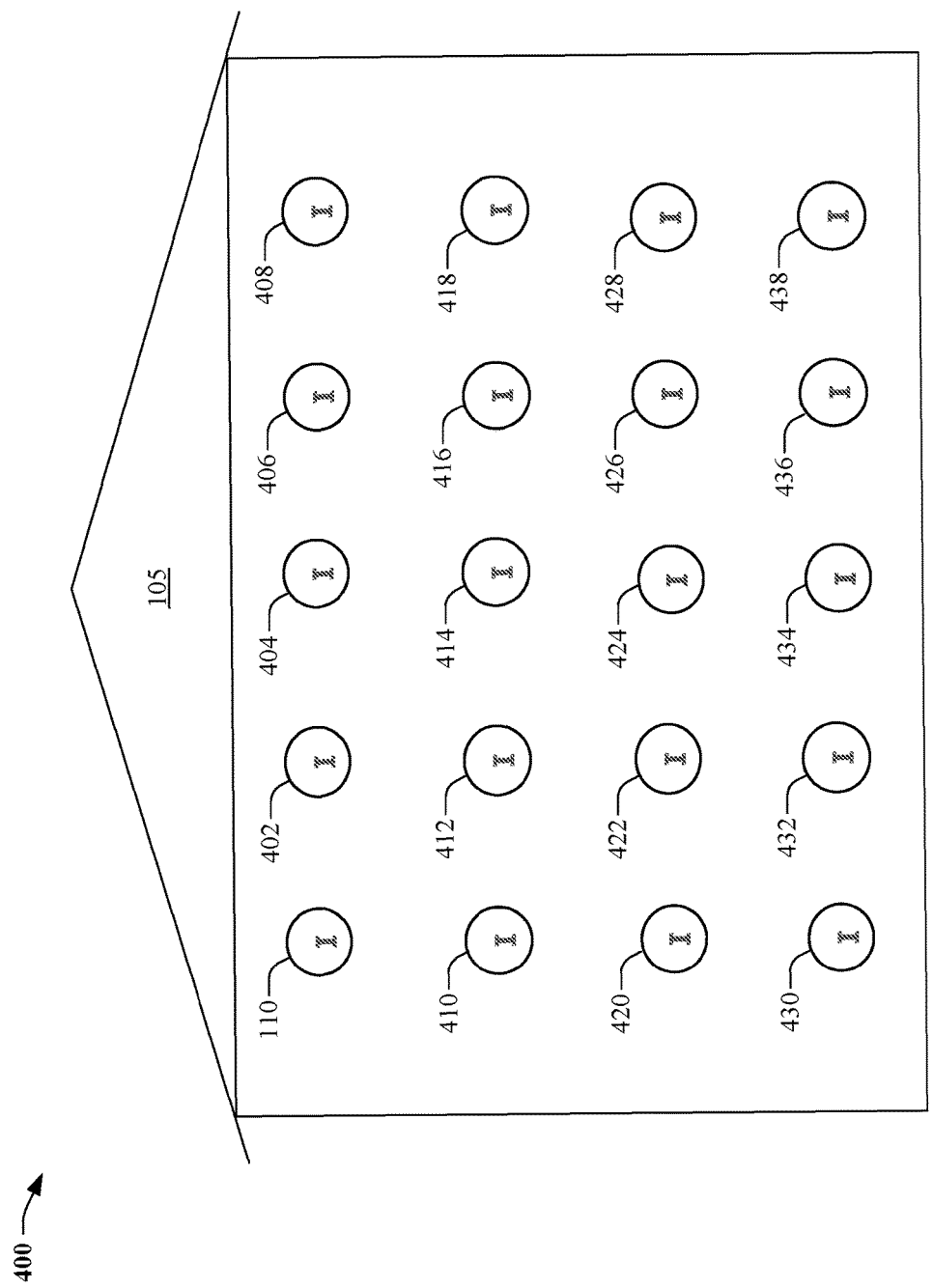
FIG. 4 illustrates a block diagram of small cell AP devices in a building after an initialization of such devices, in accordance with various embodiments.

In one embodiment, a number of small cell access point devices, e.g., see FIG. 4 and related discussion below, can be deployed within building 105. In this regards, such devices can comprise a low power/lower wireless coverage area capacity wireless node, and such node can service cellular communications, e.g., compatible with an outdoor macro cell (not shown), with a cellular communication device (not shown), etc.

Small cell access point device 110 can comprise polling component 210 and data store 220. Polling component 210 can send a message, e.g., a Radio Resource Control (RRC) based message, directed to a UE (e.g., 120, 230, 240) within a wireless coverage area from small cell access point device 110 to obtain location data from the UE. In this regard, based on the message, polling component 210 can receive a measurement report from the UE comprising the location data, e.g., comprising coordinates (e.g., latitude, longitude) and a timestamp corresponding to derivation of the coordinates.

In an embodiment, polling component 210 can send messages, e.g., RRC based messages, directed to UEs (e.g., 120, 230, 240) wireless coupled to small cell access point device 110. Further, based on such messages, polling component 210 can receive UE location data, e.g., location reports, from the UEs.

In response to receiving the measurement report from the UE, the UE location data from the UEs, etc. small cell access point device 110 can determine, assign, etc., based on the measurement report, the UE location data, etc. access point location data representing a location of small cell access point device 110. In one embodiment, small cell access point device 110 can select UE location data from the location reports corresponding to a defined RF, electromagnetic, etc. condition, e.g., the selected UE location data corresponding to a UE determined to be close, substantially close, closest, e.g., within a few meters, to small cell access point device 110 based on a determined RF condition of the UE.

In this regard, small cell access point device 110 can store the access point location data, e.g., as Mobility E911 Phase II location information representing a latitude and longitude of small cell access point device 110, in data store 220. As illustrated by FIG. 1, calibration component 140 can retrieve, e.g., via wireless network 130, via a wired/wireless backhaul link (not shown) comprising fiber optic link(s)/microwave link(s), the access point location data from data store 220 and store such data in a centralized location, e.g., geo-location data store 145, e.g., for reporting—during an emergency call made via small cell access point 110—the Mobility E911 Phase II location information to a Public Safety Answering Point (PSAP), e.g., public safety answering point component 150, e.g., for the purpose of requesting emergency services be sent to building 105.

In an embodiment, small cell access point device 110 can determine, based on the time stamp, whether the location data received from the UE was measured in "real time", e.g., within a few seconds, from the sending of the message to the UE. In this regard, in response to determining that the time stamp was measured in real time, small cell access point device 110 can select the location data received from the UE as confirmed location data, and assign the confirmed location data to the access point location data, e.g., for servicing an E911 call received via small cell access point device 110.

In another embodiment, polling component 210 can send messages, e.g., RRC based messages, to a group of UEs (e.g., 120, 230, 240) to obtain group location data, measurement reports, etc. from the group of UEs. Further, in response to determining (e.g., based on respective time stamps of the group location data, based on the measurement reports, etc.) that selected data of the group location data was measured in real time, corresponds to a defined RF, electromagnetic, etc. condition with respect to communication between small cell access point device 110 and a UE of the group of UEs (e.g., representing the UE that close to, closest, within a few meters of, etc. small cell access point device 110), etc. polling component 210 can select a measurement report from the group location data, measurement reports, etc. corresponding to a UE that is associated with a defined, e.g., good, best, etc. radio frequency (RF) condition(s), etc.

In yet another embodiment, in response to determining that the time stamp of the UE was not measured in real time, e.g., in response to determining that the location data is "old data", e.g., was likely measured, determined, etc. by the UE when the UE could receive a positioning system, e.g., GPS, signal near an entrance/exterior wall of building 105, polling component 210 can select—as estimated location data—a location that corresponds to, is located within, etc. a geo-location reported by a majority of the group of UEs. Further, polling component 210 can assign the estimated location data to the access point location data, e.g., for servicing the E911 call.

In one embodiment, once small cell access point device 110 has determined, assigned, etc. the confirmed/estimated location data to the access point location data, polling component 210 can periodically re-determine, re-assign, etc. the confirmed/estimated location data as described above.

Figure 3:
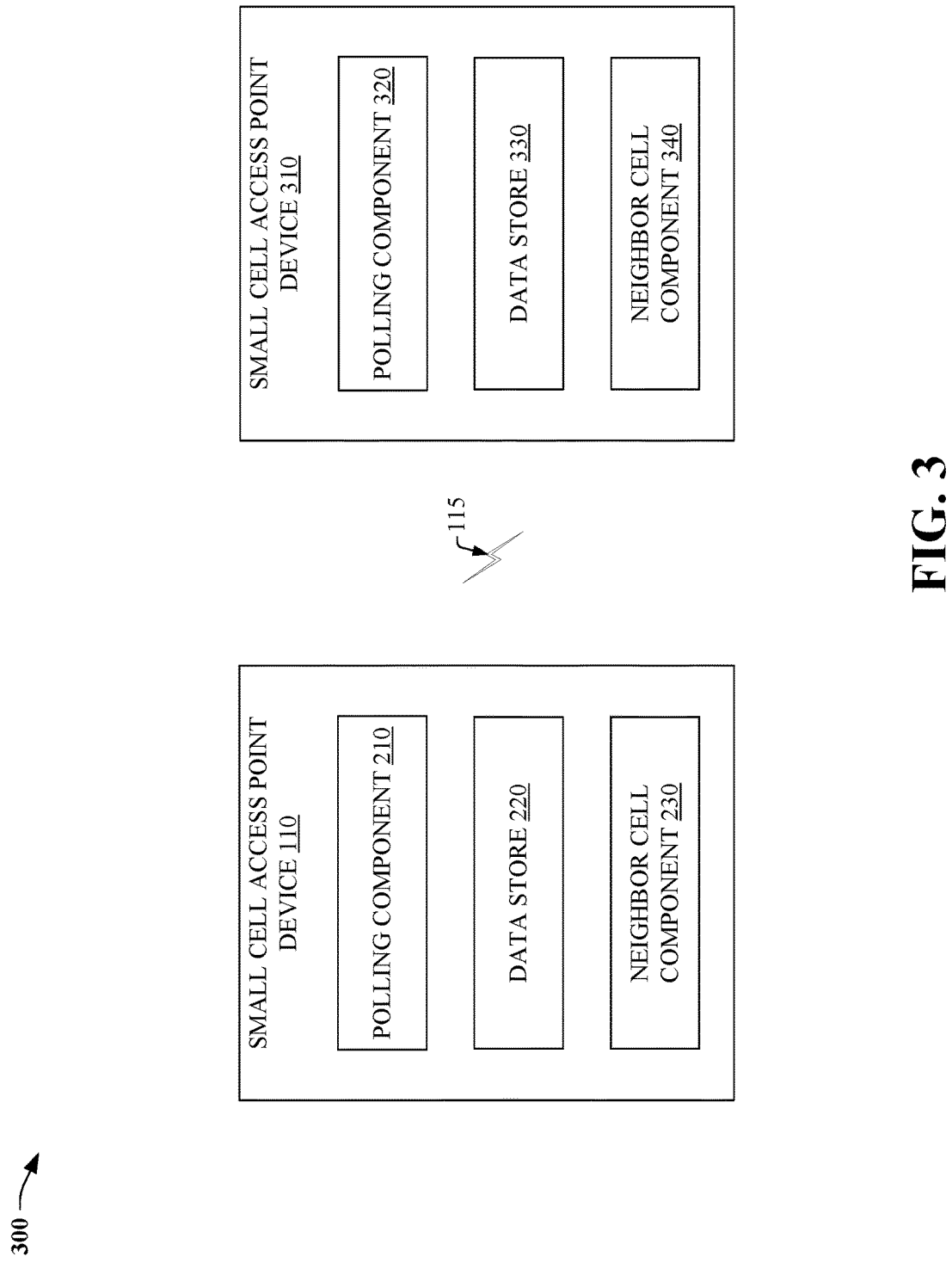
FIG. 3 illustrates a block diagram of neighboring small cell AP devices, in accordance with various embodiments.

Now referring to FIG. 3, a block diagram (300) of neighboring small cell access point devices is illustrated, in accordance with various embodiments. The neighboring small cell access point devices (e.g., 110, 310) can be proximate to, in wireless communication with, etc. each other, and include respective neighbor cell components (e.g., 230, 340) that can send/receive information between the neighboring small cell access point devices. In an embodiment, a neighbor cell component (230, 340) can broadcast, send, etc. confirmed/estimated location data from a source small cell access point device (110, 310) to a neighboring, or target, small cell access point device (310, 110). In another embodiment, the target small cell access point can poll, e.g., via polling component 210, respective UEs to obtain confirmed/estimated location data as described above. In this regard, if the target small cell access point device cannot obtain confirmed/estimated location data from a UE, the target small cell access point device can "chain" the location of its nearest neighbor, e.g., receive a broadcast of confirmed/estimated location data from the source small cell access point device, and assign, as estimated location data based on a distributed chaining algorithm, process, etc. (see below), the received location data to access point location data of the target small cell access point device.

In this regard, the target small cell access point device can use the received location data for servicing an E911 call. FIGS. 4 to 7 illustrate an example of the distributed chaining process for a group of small cell access point devices (110, 402, 404, 406, 408, 410, 412, 414, 416, 418, 420, 422, 424, 426, 428, 430, 432, 434, 436, 438) located within building 105. As illustrated by FIG. 4, the group of small cell access point device have been initialized, assigned, etc., e.g., after power up, a location matrix comprising a location chaining stratum=infinite (I), and location coordinates=NULL.

Figure 5:
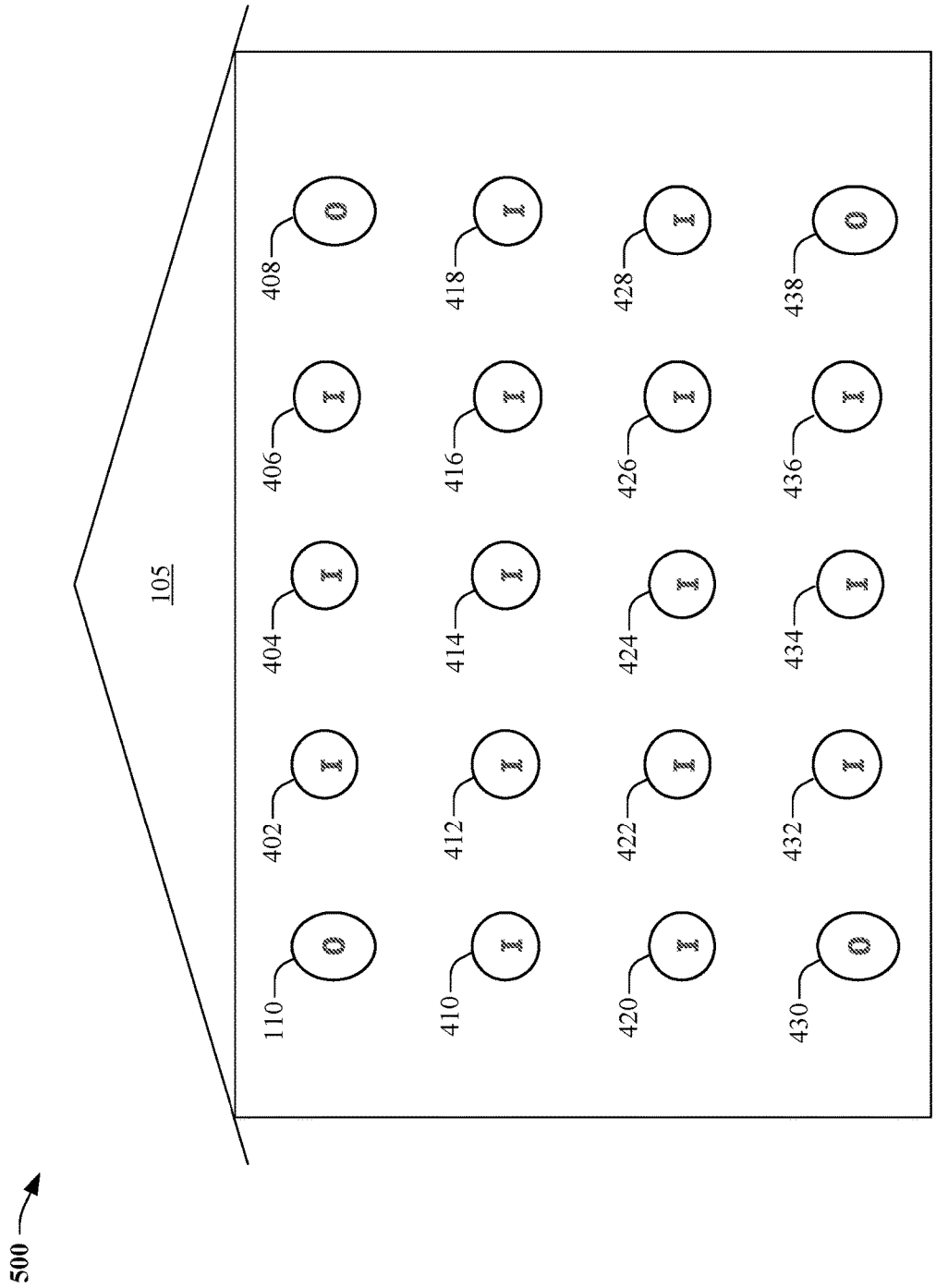
FIG. 5 illustrates a block diagram of a group of the small cell AP devices in the building that have derived confirmed location information, in accordance with various embodiments.

In an embodiment, when a small cell access point access point device updates its location matrix, it can broadcast the location matrix to neighbor small cell access point device(s) utilizing, e.g., an LTE X2 based interface, a point-to-point (P2P) neighbor interface of other technologies, etc. For example, as illustrated by FIG. 5, when four corner cells (110, 408, 430, and 438) each obtain a respective confirmed location, they update their location matrices, e.g., location chaining stratum=0 and location coordinates=the respective confirmed location.

Figure 6:
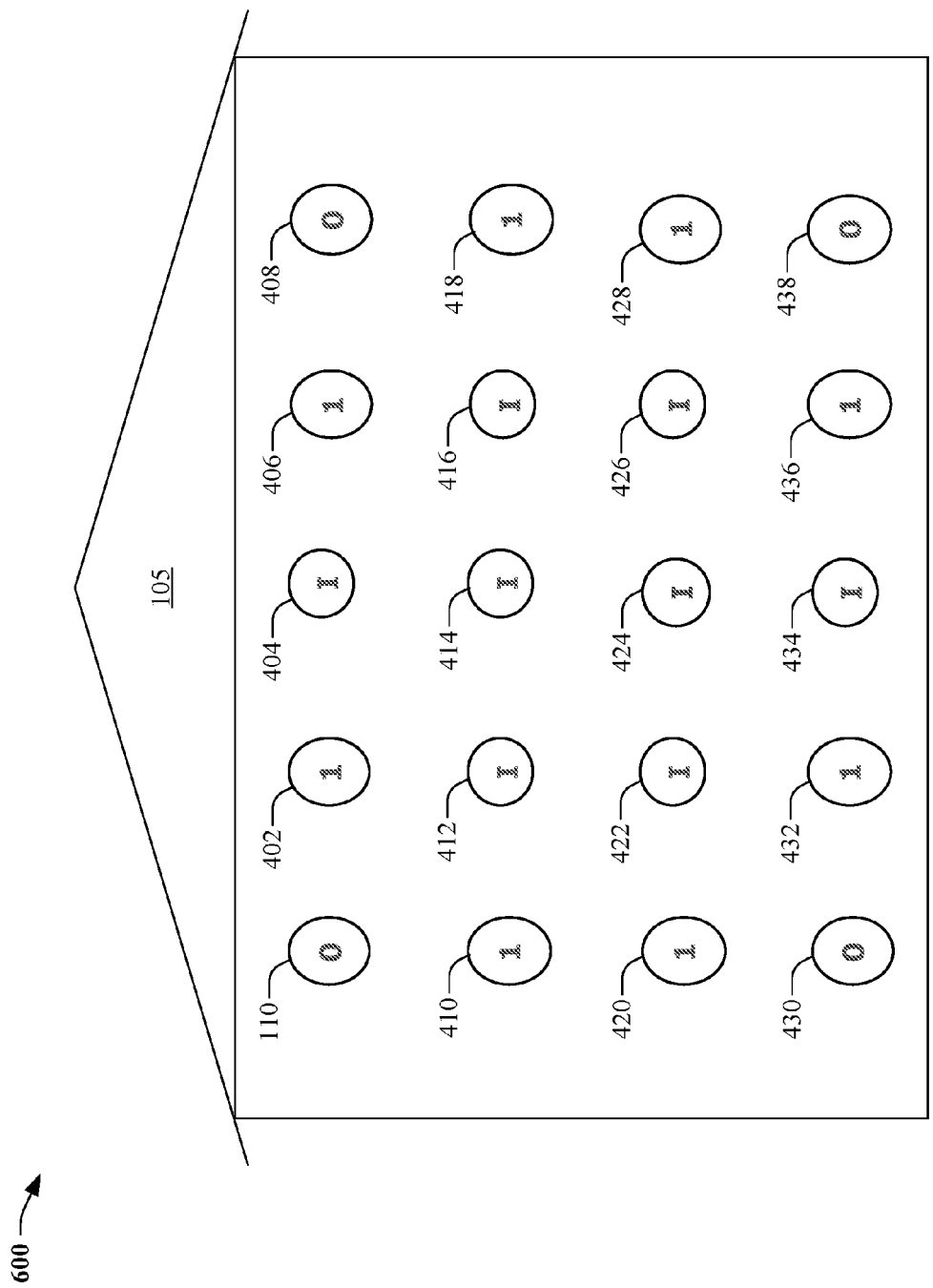
FIG. 6 illustrates a block diagram of another group of the small cell AP devices in the building that have derived estimated location information, in accordance with various embodiments.

Further, as illustrated by FIG. 6, the four corner cells broadcast their location matrix to respective neighbor small cell access point devices (402, 410, 406, 418, 420, 432, 428, 436). In this regard, each neighbor small cell access point device that receives a location matrix from a sending cell having a location chaining stratum=0, updates its location chaining stratum=1, and updates its location coordinates=sending cell's location coordinates.

In embodiment(s), a neighbor small cell access point device that receives a location matrix from a sending cell having a location chaining stratum=1, updates its location chaining stratum=2, and its location coordinates=sending cell's location coordinates. In other embodiment(s), when the neighbor cell access point device receives a location matrix from the sending cell having a location chaining stratum=infinite and location coordinates=estimated location, the neighbor cell access point device updates its location chaining stratum=infinite, and its location coordinates=sending cell's estimated location coordinates.

In yet other embodiment(s), when a small cell access point device receives a location matrix broadcast, the small cell access point device can compare the received neighbor location chaining stratum (denoted by M) with its own stratum (denoted by N). If M+1<N, then the small cell access point device updates its location stratum to M+1, and its location to the received neighbor location data, e.g., as a "chained location." Otherwise, no update is performed.

In an embodiment, when a new small cell access point device is added to an existing group, e.g., of building 105, the new small cell access point device can request, poll, etc., e.g., via a neighbor cell component (e.g., 230, 340), a location matrix from neighbor small cell access point device(s).

In other embodiment(s), the distributed chaining algorithm can be used to propagate other information, attribute(s), etc. within a group of nodes, e.g., the group of small cell access point devices, etc.

Figure 7:
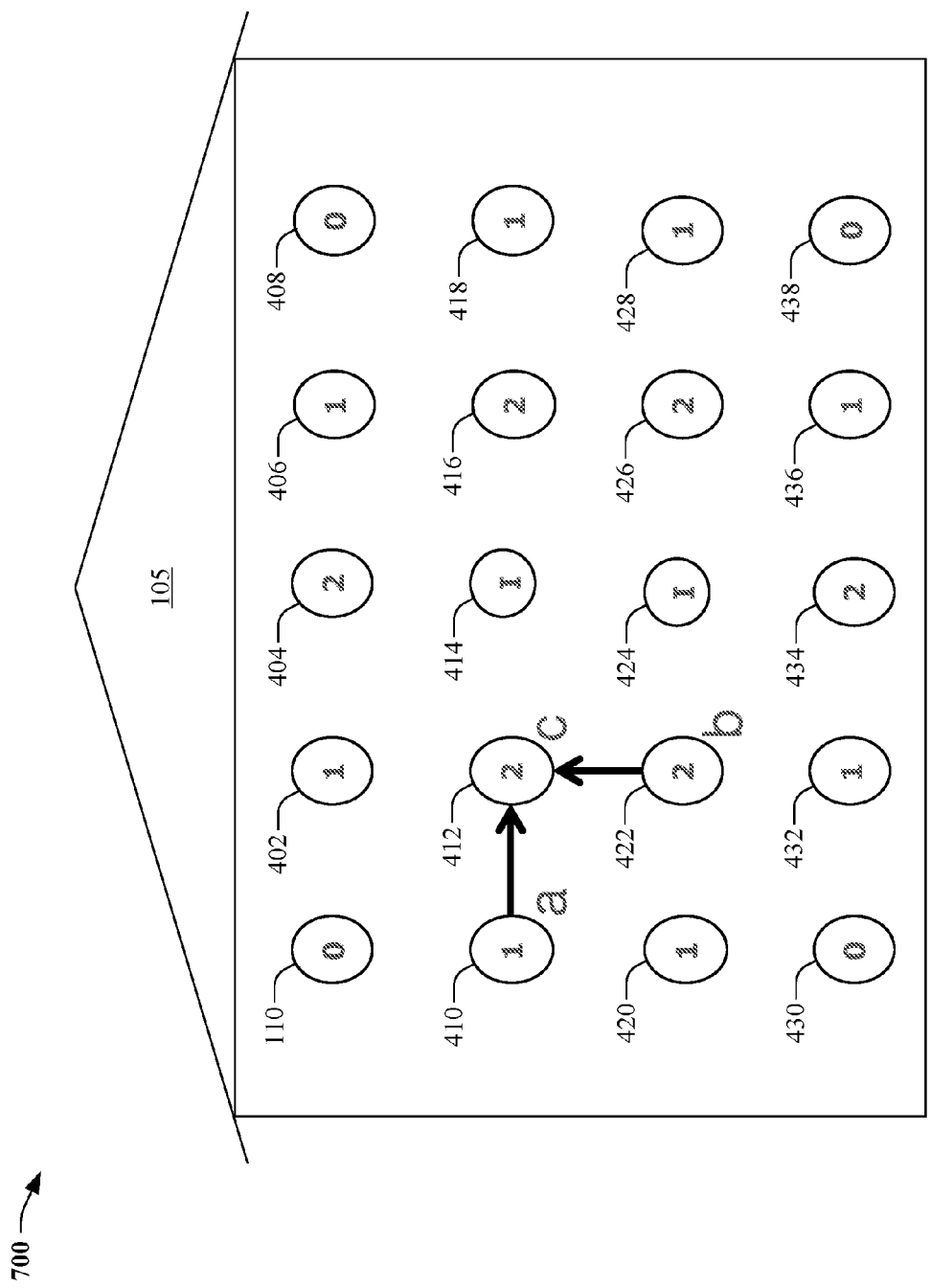
FIG. 7 illustrates a block diagram of yet another group of the small cell AP devices in the building that have derived estimated location information, in accordance with various embodiments.

As illustrated by FIG. 7, some small cells access point devices can update their location matrix several times, e.g., until convergence. For example, if small cell access point device 412 ('c') initially receives a location matrix broadcast from small cell access point device 410 ('a'), then small cell access point device 412 can update its location chaining stratum=2 by chaining the location matrix of small cell access point device 410 associated with location chaining stratum=1. Later, when small cell access point device 412 receives a location matrix broadcast from small cell access point device 422 ('b') associated with location chaining stratum=2, small cell access point device 412 can keep its location matrix without any update.

In another example, if small cell access point device 412 initially receives a location matrix broadcast from small cell access point device 422, then small cell access point device 412 can update its location chaining stratum=3 by chaining the location matrix of small cell access point device 422 associated with location chaining stratum=2. Later, when small cell access point device 422 receives a location matrix broadcast from small cell access point device 410, then small cell access point device 422 can update its location chaining stratum=2 by chaining the location matrix of small cell access point device 410 associated with small cell access point device 410.

In an embodiment, if a small cell access point device determines that it does not have any neighbor small cell access point device, and determines that it does not have a confirmed location, then the small cell access point device can update its location chaining stratum=infinite, and location coordinates=estimated location, e.g., such location coordinates being assigned, e.g., by calibration component 140, via geo-location data store 145. In one embodiment, in response to calibration component 140 determining that the small cell access point device does not have any neighbor small cell access point devices, calibration component 140 can determine the estimated location based on a confirmed location assigned to a small cell access point device located near an entrance/exterior wall of the building.

In this regard, and now referring now to FIG. 3, calibration component 140 can be configured to derive, for each new building with small cell access point device(s) installed, location data, calibration data, etc. for the small cell access point device(s), e.g., using an estimated location and/or a confirmed location of a small cell access point device, e.g., doorway cell, located near a doorway/exterior wall of the building.

In one embodiment, calibration component 140 can receive, e.g., periodically, calibration data, e.g., an address of building 105, GPS coordinates of building 105, respective timestamps representing derivation of such information, confirmed location information of respective small access point devices, etc. Further, calibration component 140 can update geo-coding data store 145 with such information for calibration of data of geo-location data store 145, e.g., for calibration of a physical address of building 105, the doorway cell, confirmed/estimated location information of small cell access point device(s) of building 105, etc.

In another embodiment, in response to restart, reboot, initialization, re-initialization, etc. of small cell access point device(s) of building 105, e.g., in response to receiving notification of such events from the small cell access point device(s), calibration component 140 can automatically, dynamically, etc. update, calibrate, etc. geo-location data store 145 with confirmed/estimated location information of the small call access point device(s).

In an embodiment, calibration component 140 can poll, periodically via wireless network 130, small cell access point device(s) included in building 105 to obtain portion(s) of the calibration data. In this regard, if calibration component 140 determines that no response to the polling has been received, calibration component 140 can initiate removal of a building address from geo-location data store 145, initiate a message, warning, etc. directed to various components, devices, etc. of emergency telecommunication service network environment 100, e.g., indicating no response to the polling has been received, recommending removal of the building address from geo-location data store 145, etc.

FIGS. 8-11 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
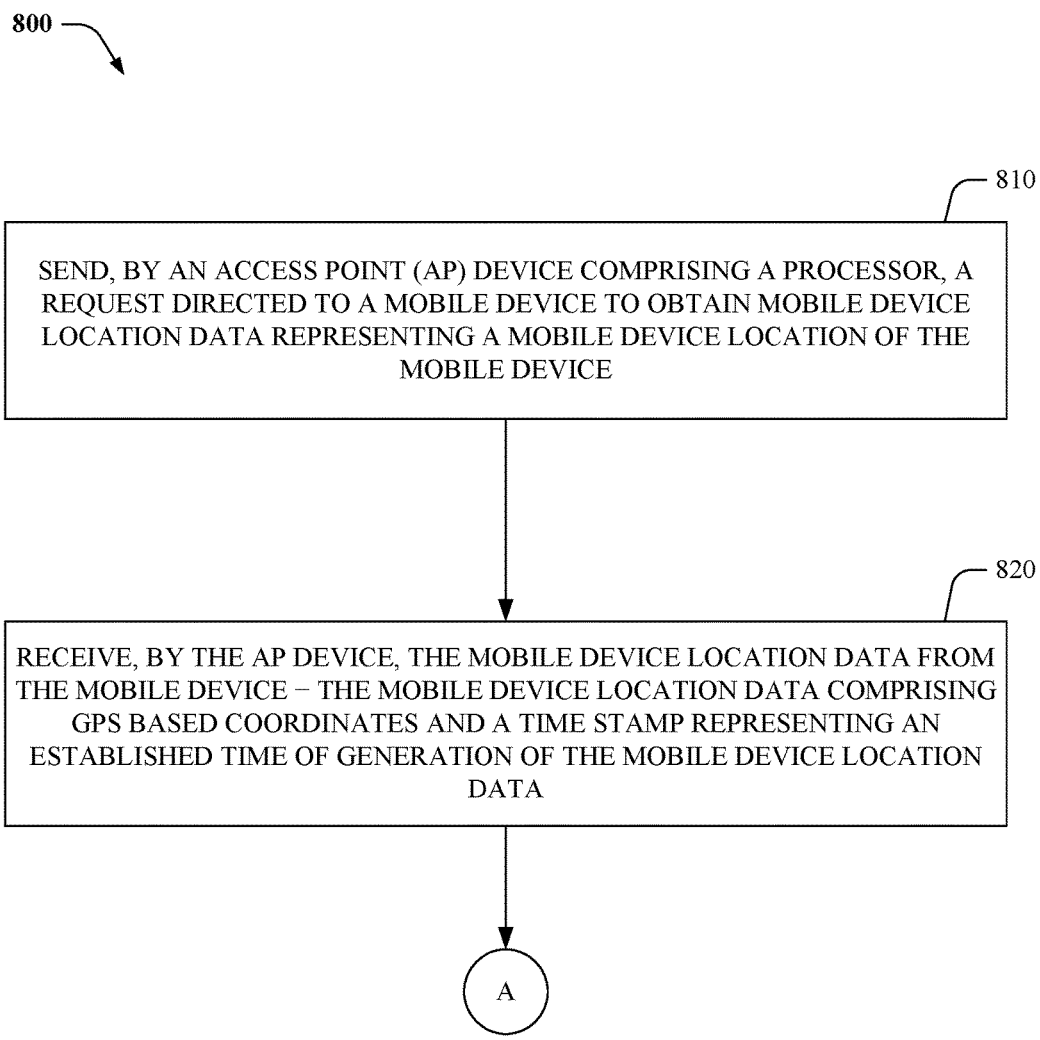
FIGS. 8-11 illustrate flow diagrams of methods associated with a small cell AP device, in accordance with various embodiments.
Figure 9:
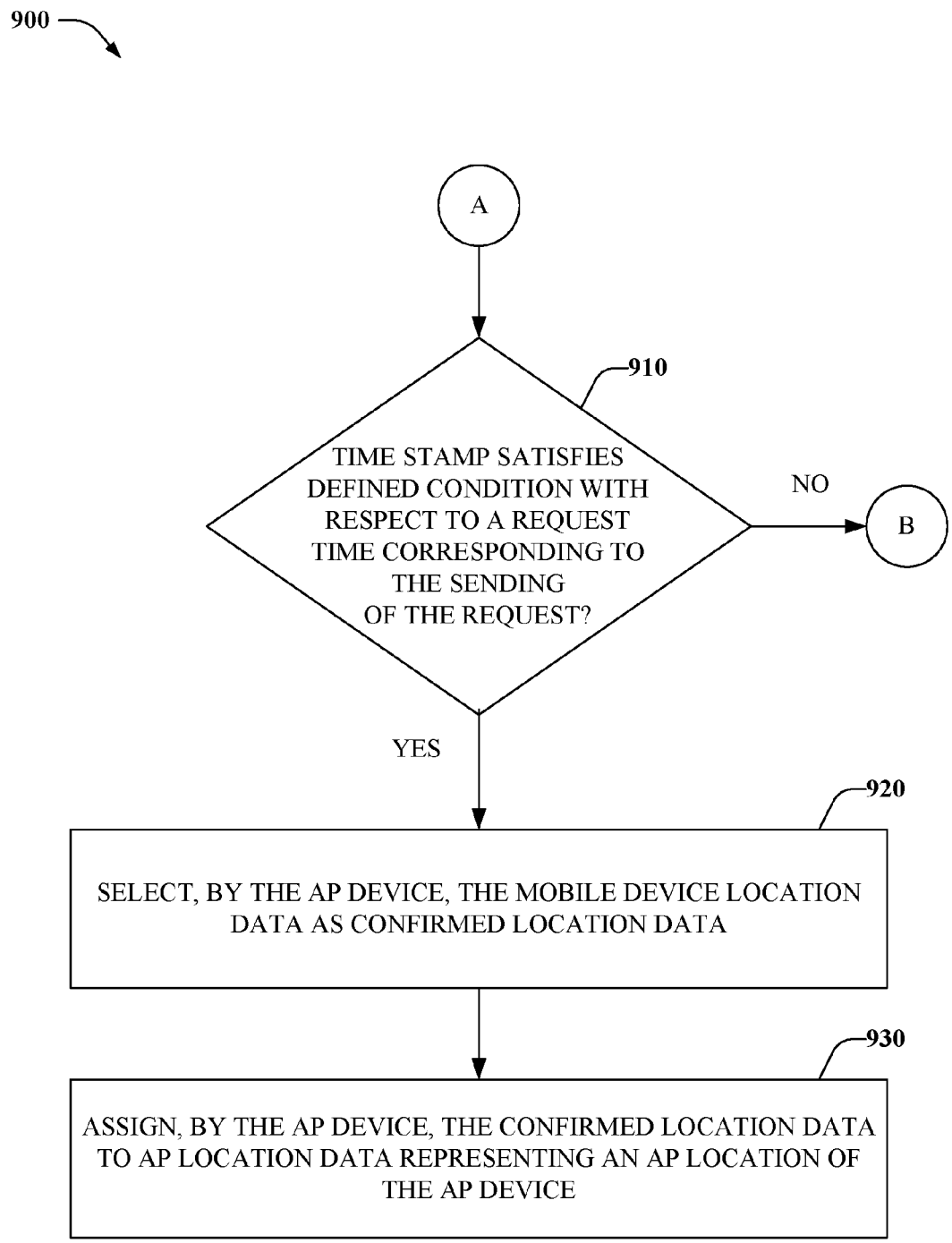
Figure 10:
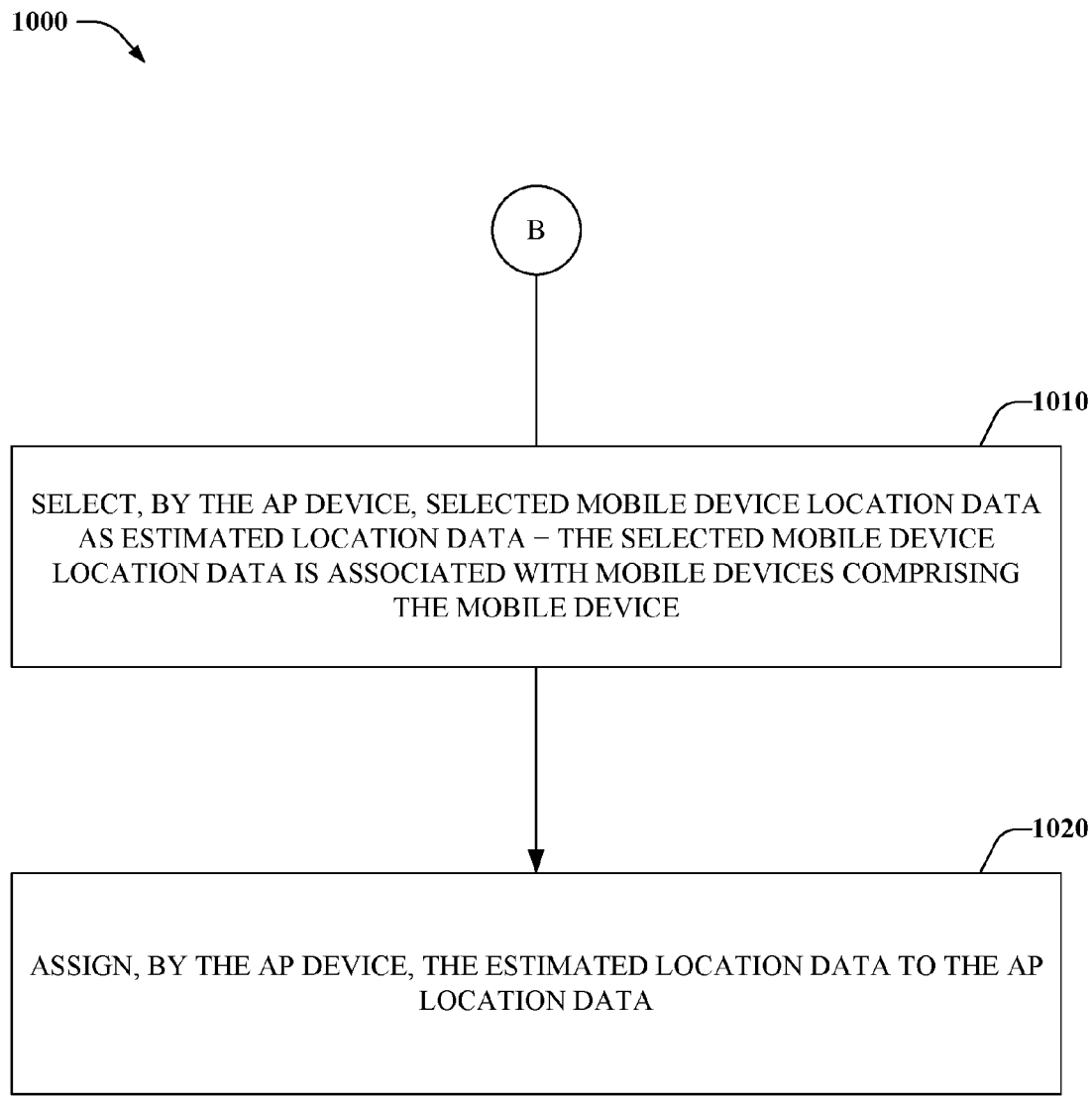

Referring now to FIGS. 8-10, processes 800-1000 performed by system(s), and/or component(s) described herein, e.g., small cell access point device 110, are illustrated, in accordance with various embodiments. At 810, an access point device, e.g., WHP device, can send a request directed to a mobile device, UE, etc. to obtain mobile device location data representing a mobile device location of the mobile device. At 820, the access point device can receive the mobile device location data from the mobile device—the mobile device location data comprising GPS based coordinates and a time stamp representing an established time of generation of the mobile device location data.

Flow continues from 820 to 910, at which it can be determined whether the time stamp satisfies a defined condition with respect to a request time corresponding to the sending of the request. In this regard, if it is determined that the time stamp satisfies the defined condition, e.g., the GPS based coordinates were measured in "real time," e.g., within a few seconds of the request time, then flow continues to 920, at which the mobile device location data, e.g., the GPS based coordinates, can be selected by the access point device as confirmed location data; otherwise, flow continues to 1010. Flow continues from 920 to 930, at which the access point device can assign the confirmed location data to access point location data representing an access point location of the access point device.

Referring now to 1010, selected mobile device location data can be selected by the access point device as estimated location data—the selected mobile device location data being associated with a group of mobile devices comprising the mobile device. In this regard, in an embodiment, the estimated location data can represent a location that corresponds to, is located within, etc. a geo-location reported by a majority of the group of mobile devices. Flow continues from 1010 to 1020, at which the access point device can assign the estimated location data to the access point location data.

Figure 11:
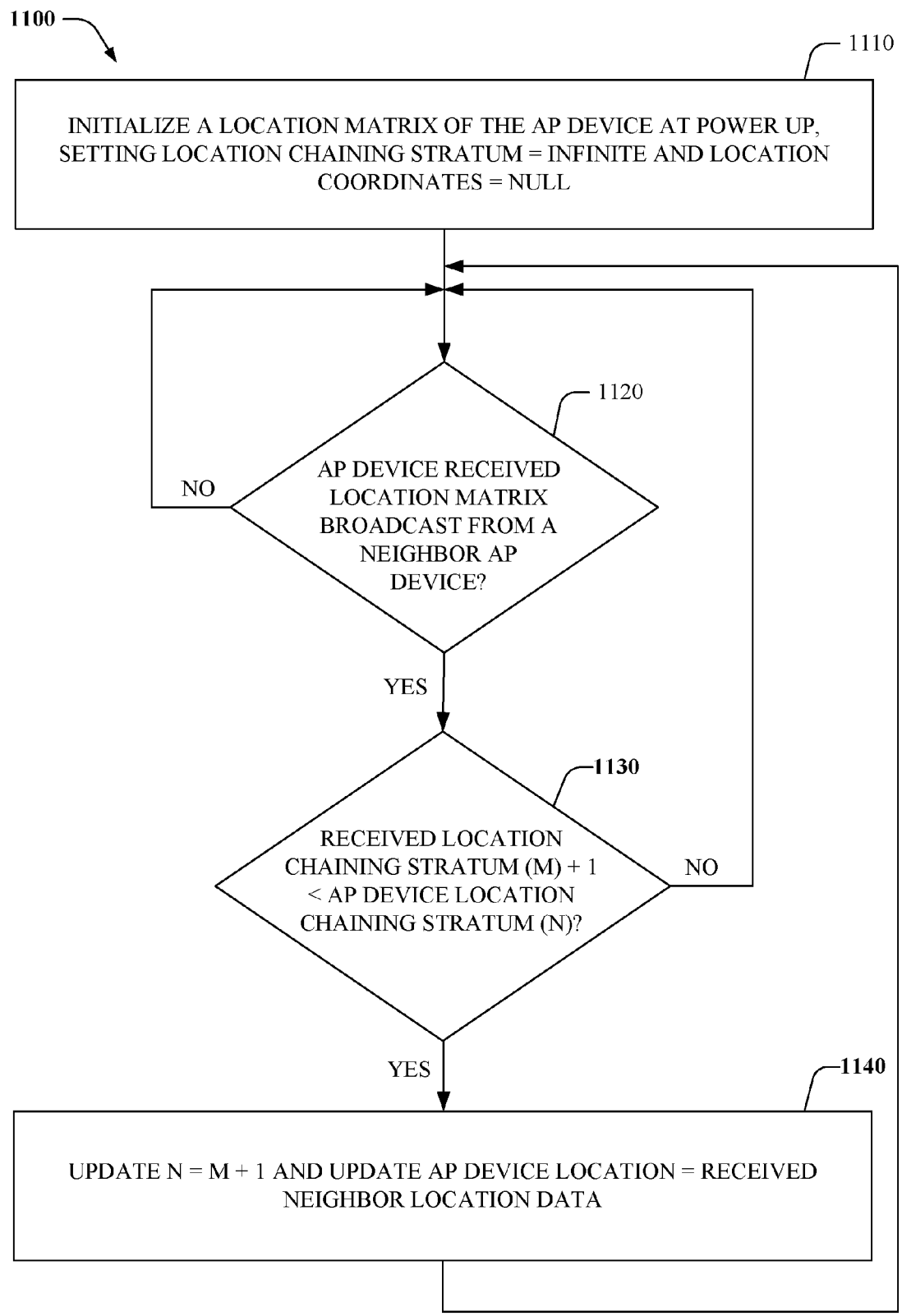

Now referring to FIG. 11, a process (1100) for performing a distributed chaining algorithm used to propagate location information within a group of small cell access point devices is illustrated, in accordance with an embodiment. At 1110, a location matrix of an access point device, e.g., of the group of small cell access point devices, can be initialized at power up. In this regard, a location chaining stratum of the location matrix can be set to "infinite", and location coordinates of the location matrix can be set to "NULL", e.g., representing an undefined value.

At 1120, it can be determined whether the access point device of the group of small cell access point devices received a location matrix broadcast from a neighbor access point device. If it is determined that the access point device received the location matrix, then flow continues to 1130; otherwise flow returns to 1120.

At 1130, it can be determined whether a location chaining stratum (M)+1 of the received location matrix is less than a location chaining stratum (N) of the access point device. In this regard, if is determined that M+1<N, then flow continues to 1140, at which the access point device can update N=M+1, and update the access point device location=received neighbor location data; otherwise, flow returns to 1120.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in geo-location data store 145, data store 220, data store 330, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
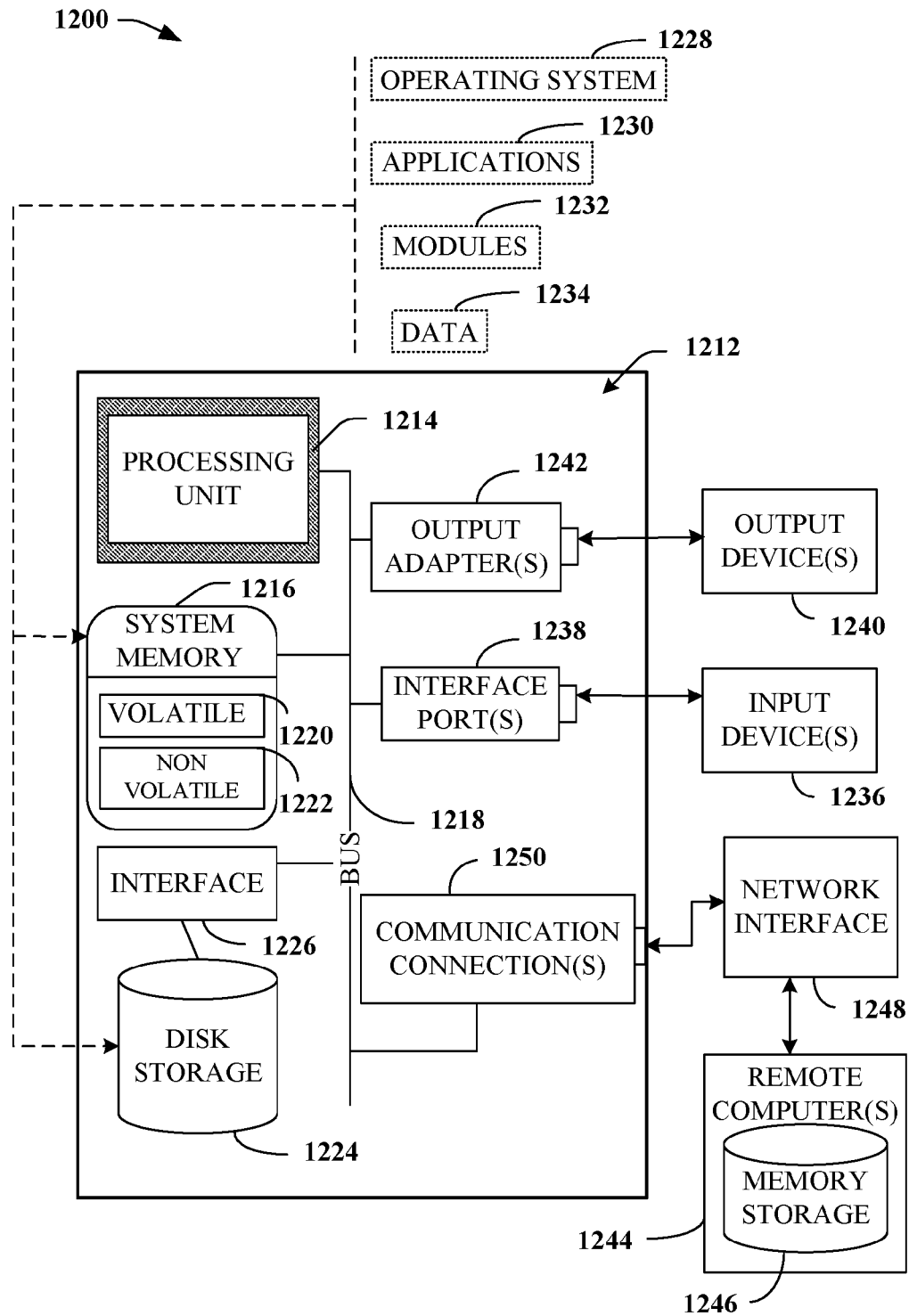
FIG. 12 illustrates a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed components, systems, devices, etc., e.g., small cell access point device 110, calibration component 140, polling component (210, 320), neighbor cell component (230, 340), public safety answering point component 150, etc. is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1314.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 include, for example, a serial port, a parallel port, a game port, a universal serial bus (USB), a wireless based port, e.g., WiFi, Bluetooth®, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 include, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An access point device, comprising:
a processor;
a memory that stores executable instructions that, when executed by the processor, facilitate performance of operations, comprising:
sending a message directed to a user equipment requesting the user equipment to send a measurement report to the access point device, wherein the measurement report comprises user equipment location data representative of a user equipment location of the user equipment;
in response to the sending the message, receiving the measurement report from the user equipment;
in response to the measurement report, determining access point location data representative of an access point location of the access point device; and
servicing an emergency call to the user equipment based on the access point location.

2. The access point device of claim 1, wherein the measurement report comprises a time stamp representative of a time of determination of the user equipment location data.

3. The access point device of claim 2, wherein the operations further comprise:
determining whether the time stamp satisfies a defined condition with respect to the sending of the message.

4. The access point device of claim 3, wherein the operations further comprising:
in response to determining that the time stamp satisfies the defined condition with respect to the sending of the message, assigning the user equipment location data to the access point location data as a confirmed access point location.

5. The access point device of claim 4, wherein the operations further comprise:
broadcasting confirmed access point location data representative of the confirmed access point location to a neighbor access point device.

6. The access point device of claim 3, wherein the operations further comprise:
in response to determining that the time stamp does not satisfy the defined condition with respect to the sending of the message, polling a group of user equipment comprising the user equipment to obtain an estimated access point location; and
assigning the estimated access point location to the access point location data.

7. The access point device of claim 1, wherein the measurement report is a first measurement report, and wherein the operations further comprise:
sending requests for second measurement reports directed to the user equipment.

8. The access point device of claim 1, wherein the measurement report comprises coordinates of the user equipment.

9. The access point device of claim 1, wherein the measurement report comprises an altitude of the user equipment.

10. A non-transitory machine-readable storage medium, comprising executable instructions that, when executed by a processor of an access point device, facilitate performance of operations, comprising:
in response to sending a request for a measurement report directed to a mobile device, receiving the measurement report from the mobile device, wherein the measurement report comprises information representing a first location of the mobile device;
based on the information, determining a second location of the access point device; and
servicing an emergency call to the mobile device based on the first location of the mobile device.

11. The non-transitory machine-readable storage medium of claim 10, wherein the operations further comprise:
in response to determining that a time corresponding to a derivation of the measurement report satisfies a defined condition with respect to the receiving the measurement report, assigning the first location to the second location as a confirmed location.

12. The non-transitory machine-readable storage medium of claim 10, wherein the operations further comprise:
in response to determining that a time corresponding to a derivation of the measurement report does not satisfy a defined condition with respect to the receiving the measurement report, polling a group of mobile devices comprising the mobile device to obtain an estimated location.

13. The non-transitory machine-readable storage medium of claim 12, wherein the operations further comprise:
assigning the estimated location to the second location.

14. A method, comprising:
in response to sending a message directed to a user equipment, receiving, by an access point device comprising a processor, a measurement report from the user equipment;
in response to the measurement report, determining, by the access point device, access point location data representative of an access point location of the access point device; and
servicing, by the access point device, an emergency call to the user equipment based on the access point location data.

15. The method of claim 14, wherein the message comprises information requesting the user equipment to send the measurement report to the access point device.

16. The method of claim 15, wherein the measurement report comprises user equipment location data representative of a user equipment location of the user equipment.

17. The method of claim 15, further comprising:
broadcasting the confirmed access point location to a neighbor access point device.

18. The method of claim 14, wherein the measurement report comprises a time stamp representative of a time of determination of the user equipment location data.

19. The method of claim 18, wherein the operations further comprise:
determining whether the time stamp satisfies a defined condition with respect to the sending of the message; and
in response to determining that the time stamp satisfies the defined condition with respect to the sending of the message, assigning the user equipment location data to the access point location data as a confirmed access point location.

20. The method of claim 18, wherein the operations further comprise:
in response to determining that the time stamp does not satisfy the defined condition with respect to the sending of the message, polling a group of user equipment comprising the user equipment to obtain an estimated access point location; and
assigning the estimated access point location to the access point location data.

* * * * *